Nov. 22, 1955 — W. E. BROWN — 2,724,750
DIRECTION SIGNAL SWITCH MECHANISM
Filed July 13, 1954

INVENTOR
William E. Brown
BY Paul Fitzpatrick
ATTORNEY

United States Patent Office 2,724,750
Patented Nov. 22, 1955

2,724,750

DIRECTION SIGNAL SWITCH MECHANISM

William E. Brown, Anderson, Ind., assignor to General Motors Corporation, Detroit, Mich., a corporation of Delaware Application July 13, 1954, Serial No. 442,937

11 Claims. (Cl. 200—61.34)

This invention relates to switch operating mechanisms and particularly to a direction signal switch operating mechanism of the type adapted for manual adjustment to a switch operating position and automatic cancelling responsive to rotation of a vehicle steering wheel.

The prior art is replete with direction signal switch operating mechanisms of the manually set and automatically reset type. More recently, mechanisms have been developed which in addition to the normal operating characteristics permit overriding of the automatic cancelling action in the event that the mechanism becomes obstructed or is manually restrained in a signal operating position while the steering wheel is rotated in a direction normally effective to return said mechanism to neutral. One example of this type of mechanism is disclosed in the copending application of David C. Redick, entitled Direction Signaling Device, Serial No. 251,785, filed October 17, 1951. Because of the increased functional requirements, mechanisms of this type have heretofore required additional parts and more complex structures.

An object of the present invention is to provide a direction signal operating mechanism of the stated character wherein the number and complexity of operating parts is substantially reduced.

Another object is to provide a switch operating mechanism of the type described, having means for varying the effective resistance of a single resilient element whereby to accomplish bypassing, cancelling and overriding of a manually set signal operating position.

Another object is to provide a switch operating mechanism having pivotal cancelling pawls rotatably engageable by a steering member to return the mechanism to neutral, wherein a single spring coacts with the pawls to provide low resistance to rotation thereof in one direction and high resistance to rotation thereof in the opposite direction.

A still further object is to provide a direction signal switch operating mechanism which is simple in construction, low in cost and efficient in operation.

Figure 1:
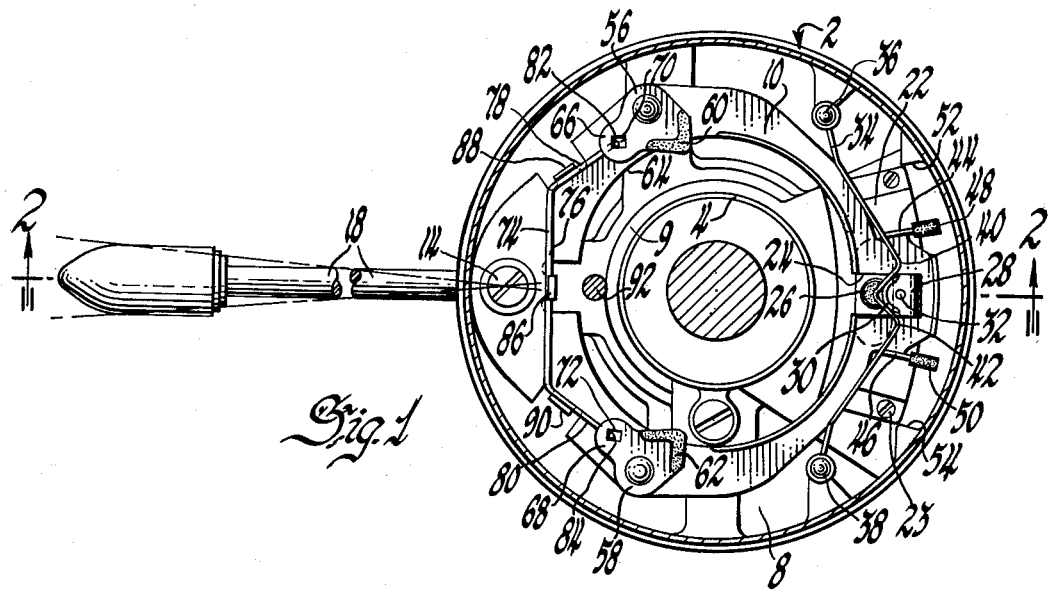
Figure 2:
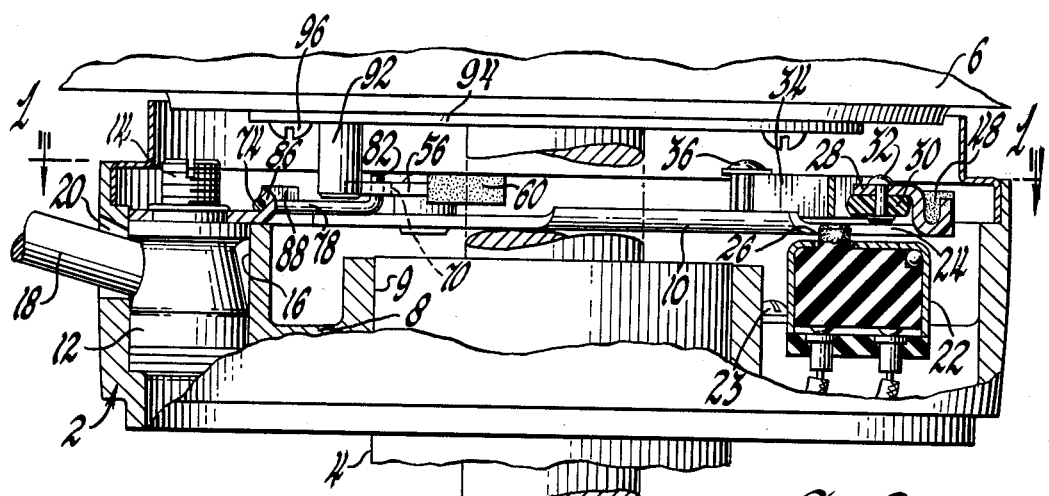

These and other objects and advantages of the invention will become more apparent as reference is had to the foregoing specification and drawings wherein:

Fig. 1 is a plan view, partly in section, showing the construction and arrangement of parts of the invention, and Fig. 2 is an enlarged sectional elevational view looking in the direction of arrows 2—2 of Fig. 1.

Referring now to the drawings and particularly Fig. 1, the numeral 2 designates a cylindrical housing adapted to be secured on the upper end of a vehicle steering column 4 axially adjacent the base of a steering wheel 6. As seen in Fig. 2, housing 2 is provided with a transverse web portion 8 having a flanged central opening 9 adapted to frictionally embrace the upper end of column 4 to secure housing 2 against axial and rotational movement thereon. Disposed interiorly of housing 2 in generally concentric relation therewith is a switch operating ring 10 which is rigidly secured to a depending stud 12 by threaded member 14. Stud 12 is rotatably disposed in a depending bore 16 formed at one side of housing 2 and is retained therein against axial movement by a switch operating handle 18. Operating handle 18 extends through a circumferential slot 20 in a wall of housing 2 and threadably engages the midportion of stud 12.

Diametrically opposite stud 12, an electrical switch 22 is secured on web 8 by means of machine screws 23. Switch 22 is of the type commonly used in direction signal systems and is so constructed as to control energization and de-energization of such systems. For a more complete description of such a switch, reference may be had to the copending application of David C. Redick, entitled Direction Signaling Device, Serial No. 251,785, filed October 12, 1951.

Vertically adjacent switch 22, ring 10 is provided with a radially extending notch 24 into which extends the upstanding operating arm 26 of switch 22. It will be apparent that swinging movement of ring 10 will cause corresponding arcuate movement of operating arm 26 and thereby effect concurrent movement of switch 22 and ring 10. Radially outwardly from notch 24, the surface of ring 10 is formed with an upwardly bulged portion 28 in which is received a detent roller 30. Detent roller 30 is rotatably secured on a vertically depending stud 32, which in turn is secured to bulged portion 28. Disposed transversely of housing 2 is a blade spring 34 having an undulated midportion adapted to yieldably engage detent roller 30. At its opposite ends, spring 34 is secured to housing 2 by means of studs 36 and 38. As seen best in Fig. 1, the configuration of the undulated midportion of spring 34 is such as to selectively yieldably retain ring 10 in a neutral position and switch operating positions at either side of the neutral position. It will be apparent that movement of ring 10 in either direction from neutral will deflect the midportion of spring 34 inwardly until the roller 30 passes over the crest 40 or 42, as the case may be. As the ring reaches either adjusted position, spring 34 yieldably returns outwardly to restrain the ring 10 in either of its operating positions. To limit the outward swinging movement of ring 10 in either direction, ring 10 is provided with a pair of integral radially extending tabs 44 and 46 having resilient buffer elements 48 and 50 secured thereto. Movement of ring 10 outwardly in either direction is arrested when buffer elements 48 or 50, respectively, engage bosses 52 or 54 formed on housing 2.

In order to accomplish automatic cancelling of a manually set signalling position in accordance with the present invention, a pair of pawls 56 and 58 are pivotally mounted on ring 10 at opposite sides thereof. Each pawl 56 and 58 is provided with a lobe portion 60 and 62, the inner ends of which extend interiorly of the inner periphery 64 of ring 10. At substantially right angles to lobe portion 60 and 62, pawls 56 and 58 are provided with ears 66 and 68 having vertical apertures 70 and 72 formed therein. Extending transversely of ring 10 between pawls 56 and 58 is a wire spring member 74 having a straight midportion 76 and inwardly diverging legs 78 and 80. At their terminal ends legs 78 and 80 are formed with upturned tips 82 and 84 which extend into apertures 70 and 72 formed in pawls 56 and 58. Spring 74 is aligned on ring 10 by an integral upturned central tab 86 and oppositely disposed integral tabs 88 and 90. Central tab 86 embraces the inner surface of midportion 76 while tabs 88 and 90, respectively, engage the outer surfaces of diverging legs 78 and 80. Each of the tabs 86, 88 and 90 are preferably curled over slightly at the upper ends thereof to prevent axial displacement of the spring relative to the ring 10. Inasmuch as the tips 82 and 84 of legs 78 and 80 extend upwardly through apertures 70 and 72 of pawls 56 and 58, it will be seen that the ears 66 and 68 of pawls 56 and 58 prevent vertical displacement of the outer end portions of legs 78 and 80, and thus assist in retaining spring 74 in assembled position.

When formed and arranged in the manner described, the spring 74 is effective to yieldably position each pawl 56 and 58 in a normal intermediate position, wherein the lobe portions 60 and 62 thereof extend inwardly of the inner periphery of ring 10. When ring 10 is in the neutral position illustrated in Fig. 1, both lobes 60 and 62 lie in a position outside the circular path of a depending cancelling lug 92. Cancelling lug 92 is mounted on a circular carrier 94 which, in turn, is secured on the lower surface of vehicle steering wheel 6 by machine screws 96. Upon swinging movement of operating handle 18 in either direction from neutral position, ring 10 is swingably displaced in housing 2 to a signal operating position wherein either lobe 60 or 62 of pawl 56 or 58, respectively, intersects the circular path of depending lug 92. When either pawl 56 or 58 is in a position wherein its lobe intersects the path of lug 92, it is necessary that the pawl be yieldably displaceable responsive to rotation of the steering wheel in a direction similar to that of the indicated turn and that the pawl normally resists displacement when engaged by the lug 92 responsive to rotation of the steering wheel in the opposite direction. As a safety factor, however, it is desirable that the pawls be capable of displacement responsive to rotation of the steering wheel in the last mentioned direction, should the ring 10 be prevented from normal movement either by a foreign obstruction or as a result of manual restraint imposed on the operating handle 18. In the present invention, the single wire spring element 74 interacts with pawls 56 and 58 and tabs 88 and 90 to accomplish all three functions. Thus, by way of example, when the mechanism is in a right turn operating position, the pawl 56 is moved to a position wherein lobe 60 intersects the circular path of lug 92. As the steering wheel is rotated in a clockwise or right turn direction, lug 92 engages and displaces pawl 56 in a counterclockwise direction against the resistance of spring 74. Since the resistance of spring 74 to counterclockwise rotation of pawl 56 is determined by the inherent flexibility of that portion of the spring between central tab 86 and the terminal end 84, it will be apparent that only moderate resistance to counterclockwise rotation of pawl 56 is encountered. However, upon reversal of rotation of the steering wheel, lug 92 engages lobe portion 60 of pawl 56 from the opposite direction, which tends to impart clockwise rotation to the pawl. Clockwise rotation of pawl 56, in turn, imparts outward swinging movement to leg 78 of spring 74. Since outward movement of leg 78 is arrested by tab 88, continued clockwise rotation of pawl 56 causes leg 78 to apply leverage to that portion of spring 74 extending between tab 88 and central tab 86. Because of the short extent of spring 74 between tabs 86 and 88, the resistance of that portion of spring 74 therebetween to clockwise rotation of pawl 56 is substantially greater than the resilient holding effect of detent spring 42. Therefore, continued reverse rotation of the lug 92 normally carries ring 10 to the neutral position. However, in the event that ring 10 is prevented from returning to the neutral position by foreign obstruction or as a result of manual restraint, progressively increasing rotational pressure of lug 92 on pawl 56 overcomes the effective resistance of that portion of the spring 74 between central tab 86 and tab 88 causing pawl 56 to be rotatively displaced clockwise to permit the lug 92 to pass. This overriding action will, of course, be repeated until the obstacle is dislodged or manual restraint removed, whereupon the normal cancelling action will resume. Inasmuch as the structure of the mechanism is entirely symmetrical, it will be apparent that the operation thereof for a left turn is identical but in a reversed sense.

From the foregoing it will be seen that a novel and highly simplified switch mechanism has been provided. Not only are substantially fewer parts required than has heretofore been possible, but in addition the need for critical alignment and adjustment is considerably reduced.

While but one embodiment of the invention has been shown and described, it will be apparent that other changes and modifications may be made therein without departing from the invention. It will, therefore, be understood that it is not intended to limit the invention to the embodiment shown but only by the scope of the claims which follow.

I claim:

1. In a direction signal switch, the combination of a fixed support, a switch movable from a central position to adjusted positions at opposite sides of said central position, an operating ring for said switch, oppositely disposed pawls pivotally mounted on said operating ring, a flexible member secured on said operating ring, means connecting each of said pawls to said flexible member, cancelling means rotatively engageable with one of said pawls when said operating ring is moved to an adjusted position, and stop means on said operating member engageable by said flexible member responsive to rotation of said pawl in one direction whereby said flexible member permits pivotal displacement of said pawl in one direction and resists pivotal displacement thereof in the opposite direction.

2. In a direction signal switch, the combination of a fixed support, a switch movable from a central position to adjusted positions at opposte sides of said central position, a switch operating ring swingably mounted on said support, detent means for yieldably retaining said operating ring in adjusted positions, oppositely disposed pawls pivotally mounted on said operating ring, a flexible member secured on said operating ring, means connecting each of said pawls to said flexible member, whereby the latter yieldably resists rotation of the former in either direction, rotatable cancelling means engageable with one of said pawls when said operating ring is moved to an adjusted position, and a stop formed on said operating member at one side of said flexible member, said stop being effective to prevent normal deflection of said member responsive to rotation of said pawl in one direction, whereby the resistance of said flexible member to rotation of said pawl in one direction is greater than the resistance of said detent means and the resistance of said flexible member to rotation of said pawl in the opposite direction is less than the resistance of said detent means.

3. In a direction signal switch, the combination of a fixed support, a switch movable from a central position to adjusted positions at opposite sides of said central position, a switch operating ring swingably mounted on said support, detent means for yieldably retaining said operating ring in adjusted positions, oppositely disposed pawls pivotally mounted on said operating ring, a flexible member secured on said operating ring, means connecting each of said pawls to said flexible member, whereby the latter yieldably resists rotation of the former in either direction, rotatable cancelling means engageable with one of said pawls when said operating ring is moved to an adjusted position, and a pair of spaced apart rigid stops formed on said operating member, said stops being disposed at one side of said flexible member and effective to prevent normal deflection of said member responsive to rotation of said pawls in one direction, whereby the resistance of said flexible member to rotation of said pawls in one direction is greater than the resistance of said detent means and the resistance of said flexible member to rotation of said pawls in the opposite direction is less than the resistance of said detent means.

4. A direction signal switch operating mechanism comprising a fixed support, a switch operating ring pivotally secured on said support, means for yieldably retaining said ring in a neutral position and adjusted positions at either side of said neutral position, oppositely disposed pawls mounted on said operating ring, cancelling means engageable with said pawls when said ring is in adjusted positions, cantilever spring means adapted to yieldably resist rotation of said pawls in either direction from an intermediate position, and rigid means on said operating member adapted for abutting engagement with an intermediate portion of said spring means upon movement thereof in one direction to increase the resistance of said resilient means to rotation of said pawl in one direction, whereby said pawl is yieldably displaced responsive to movement of said cancelling means in one direction and said ring is urged to centered position responsive to movement of said cancelling means in the opposite direction.

5. In combination, a housing, a switch mounted in said housing and movable from a central position to adjusted positions at opposite sides of said central position, an operating member swingably mounted in said housing and operatively engaging said switch, a pair of pawls pivotally mounted on said member at opposite sides thereof, flexible means connected to said operating member, the opposite ends of said last mentioned means engaging said pawls to yieldably retain the latter in an intermediate position, rotatable means engageable with said pawls when said operating member is in an adjusted position, and abutment means formed on said member near the ends of said flexible means to arrest deflection thereof in one direction whereby said flexible means permits displacement of said pawls in one direction and resists displacement thereof in the opposite direction.

6. In combination, a housing, a switch mounted in said housing and movable from a central position to adjusted positions at opposite sides of said central position, an operating member swingably mounted in said housing and operatively engaging said switch, a pair of pawls pivotally mounted on said member at opposite sides thereof, flexible means connected to said operating member, the opposite ends of said last mentioned means pivotally engaging said pawls to yieldably retain each of the latter in corresponding intermediate positions, rotatable means engageable with said pawls when said operating member is in an adjusted position, and an abutment member formed on said member near each end of said flexible means to arrest deflection thereof in one direction whereby said flexible means permits displacement of said pawls in one direction and resists displacement thereof in the opposite direction.

7. In combination, a housing, a switch mounted in said housing and movable from a central position to adjusted positions at opposite sides of said central position, an operating member swingably mounted in said housing and operatively engaging said switch, a pair of pawls pivotally mounted on said member at opposite sides thereof, flexible means connected to said operating member, the opposite ends of said last mentioned means pivotally engaging said pawls to yieldably retain each of the latter in corresponding intermediate positions, rotatable means engageable with said pawls when said operating member is in an adjusted position, and an abutment member formed on said member near each end of said flexible means to reduce deflection thereof in one direction whereby said flexible means permits displacement of said pawls in one direction and resists displacement thereof in the opposite direction.

8. In combination, a housing, a switch mounted in said housing and movable from a central position to adjusted positions at opposite sides of said central position, an operating member swingably mounted in said housing and operatively engaging said switch, a pair of pawls pivotally mounted on said member at opposite sides thereof, a flexible wire member secured on said operating member, said member having bent-up end portions operatively engaging said pawls to yieldably retain the same against rotation in either direction, rotatable cancelling means engageable with one of said pawls when said operating member is in adjusted position, oppositely disposed abutments formed on said ring at one side of said wire member and near the end thereof, said abutments coacting with said member upon initial deflection thereof in one direction to substantially reduce the normal flexibility of said member responsive to rotation of said pawl in one direction whereby said pawl is normally yieldably displaceable by said cancelling means in one direction only.

9. A direction signal switch operating mechanism comprising a cylindrical housing, a switch operating ring disposed in said housing in generally concentric relation therewith, means pivotally connecting said ring in said housing for swingable movement from a neutral position to adjusted positions at opposite sides of said neutral position, detent means for yieldably retaining said ring in said positions, a pair of pawls pivotally mounted on said ring at opposite sides thereof, said pawls having lobe portions normally extending interiorly of said frame, a generally U-shaped wire spring element extending between said pawls, means for connecting each end of said element with said pawls, additional means securing said element on said ring, said additional means coacting with said element to cause the latter to yieldably resist rotation of said pawls from said inwardly extending position.

10. A direction signal switch operating mechanism comprising a cylindrical housing, a switch operating ring disposed in said housing in generally concentric relation therewith, means pivotally connecting said ring in said housing for swingable movement from a neutral position to adjusted positions at opposite sides of said neutral position, detent means for yieldably retaining said ring in said positions, a pair of pawls pivotally mounted on said ring at opposite sides thereof, cancelling means engageable with one of said pawls when said operating ring is in an adjusted position, a wire spring having one end connected to one of said pawls and the other end connected to the other of said pawls, central abutment on said spring engaging the midportion of said spring at one side thereof, a pair of spaced apart abutments engaging said spring near the outer end thereof and at the side opposite that of said central abutment, said central abutment constituting the fulcrum for said spring when the opposite ends thereof are flexed in the corresponding directions and said spaced apart abutments constituting fulcrums for the respective ends of said spring upon flexing thereof in a direction opposite that of said first mentioned direction, said flexible means thereby being effective to provide low resistance to rotation of said pawl in one direction and high resistance to rotation thereof in the opposite direction.

11. A device as claimed in claim 10, wherein said central abutment and said spaced apart abutments are provided with portions overlying said spring to retain the same against vertical displacement from said ring.

No references cited.